United States Patent
Christenson et al.

(10) Patent No.: US 10,092,967 B2
(45) Date of Patent: *Oct. 9, 2018

(54) THREE-SIDED SHIMABLE INDEXABLE SHEAR TIP BOOT

(71) Applicant: Exodus Machines, Inc., Superior, WI (US)

(72) Inventors: Ross Denny Christenson, Esko, MN (US); Gregory Paul Bacon, Duluth, MN (US); Bruce Edward Bacon, Duluth, MN (US)

(73) Assignee: Exodus Machines, Inc., Superior, WI (US)

( * ) Notice: Subject to any disclaimer, the term of this patent is extended or adjusted under 35 U.S.C. 154(b) by 222 days.

This patent is subject to a terminal disclaimer.

(21) Appl. No.: 15/234,514

(22) Filed: Aug. 11, 2016

(65) Prior Publication Data

US 2016/0348338 A1    Dec. 1, 2016

Related U.S. Application Data

(63) Continuation-in-part of application No. 14/261,592, filed on Apr. 25, 2014, now Pat. No. 9,713,848.

(51) Int. Cl.
*B23D 35/00* (2006.01)
*B23D 17/00* (2006.01)
(Continued)

(52) U.S. Cl.
CPC ......... *B23D 35/002* (2013.01); *B23D 35/001* (2013.01); *E02F 3/965* (2013.01);
(Continued)

(58) Field of Classification Search
CPC ....... B23D 17/00; B23D 35/00–35/002; B25F 3/00
(Continued)

(56) References Cited

U.S. PATENT DOCUMENTS

| 3,006,089 A | 10/1961 | Johnson |
| 4,104,792 A | 8/1978 | LaBounty |

(Continued)

FOREIGN PATENT DOCUMENTS

| DE | 29708705 | 8/1997 |
| EP | 0666131 | 8/1995 |

(Continued)

OTHER PUBLICATIONS

International Search Report and Written Opinion of PCTUS2015/026828 dated Jul. 24, 2015.

*Primary Examiner* — Jason Daniel Prone
(74) *Attorney, Agent, or Firm* — Briggs and Morgan, P.A.; Gerald E. Helget (57) ABSTRACT

A one piece three-sided hardened steel boot tip for a distal end upper jaw tang of a heavy duty demolition shear having a upper movable shear jaw with a shear tip or tang. The boot tip has a front wall seated on the tang front edge and a right sidewall. A bottom wall of the boot tip is seated on the tang bottom seat forming a shear punching edge between the front wall and the bottom wall. A sidewall is connected to the tang bottom and front walls with a shearing edge between the side and bottom walls. A side plate with an indexing hub is seated on the guide side tang face, the top seat and the rear seat.

10 Claims, 9 Drawing Sheets

(51) Int. Cl.
  *E02F 3/96* (2006.01)
  *E02F 9/28* (2006.01)
(52) U.S. Cl.
  CPC ............ *E02F 9/285* (2013.01); *E02F 9/2858* (2013.01); *E02F 9/2883* (2013.01); *B23D 17/00* (2013.01)
(58) Field of Classification Search
  USPC ....... 30/134, 228, 379, 379.5; D15/123, 138
  See application file for complete search history.

(56) References Cited

U.S. PATENT DOCUMENTS

| | | | |
|---|---|---|---|
| 4,188,721 A | 2/1980 | Ramun et al. |
| 4,198,747 A | 4/1980 | LaBounty |
| 4,403,431 A | 9/1983 | Ramun et al. |
| 4,543,719 A | 10/1985 | Pardoe |
| 4,558,515 A | 12/1985 | LaBounty |
| 4,776,093 A | 10/1988 | Gross |
| 4,897,921 A | 2/1990 | Ramun |
| 5,146,683 A | 9/1992 | Morikawa et al. |
| 5,187,868 A | 2/1993 | Hall |
| 5,339,525 A | 8/1994 | Morikawa |
| 5,531,007 A | 7/1996 | Labounty |
| 5,533,682 A | 7/1996 | de Gier et al. |
| 5,873,168 A | 2/1999 | Johnson et al. |
| 5,894,666 A | 4/1999 | Hrusch |
| 5,940,971 A | 8/1999 | Ramun |
| 5,992,023 A | 11/1999 | Sederberg et al. |
| 6,061,911 A | 5/2000 | LaBounty et al. |
| 6,119,970 A | 9/2000 | LaBounty et al. |
| 6,202,308 B1 | 3/2001 | Ramun |
| 6,655,054 B1 | 12/2003 | Ward |
| 6,839,969 B2 | 1/2005 | Jacobson et al. |
| 6,926,217 B1 | 8/2005 | LaBounty et al. |
| 7,216,575 B2 | 5/2007 | Alseth et al. |
| 7,284,718 B2 | 10/2007 | Christenson |
| 7,306,177 B2 | 12/2007 | Ward |
| 7,487,930 B2 | 2/2009 | Sederberg et al. |
| D602,509 S | 10/2009 | van Gemert |
| D622,297 S | 8/2010 | van Gemert |
| 7,895,755 B2 | 3/2011 | Jacobson et al. |
| 8,146,256 B2 | 4/2012 | Johnson et al. |
| 8,176,636 B2 | 5/2012 | Bush |
| D687,077 S | 7/2013 | Gerardus de Gier |
| D687,470 S | 8/2013 | Gerardus de Gier |
| 9,132,490 B2 | 9/2015 | Ramun |
| 9,333,570 B2 | 5/2016 | Clemons et al. |
| 9,713,848 B2 * | 7/2017 | Christenson ........... E02F 9/2883 |
| 2002/0011535 A1 | 1/2002 | Cook |
| 2004/0093739 A1 | 5/2004 | Jacobson et al. |
| 2007/0130776 A1 | 6/2007 | Grant et al. |
| 2008/0072434 A1 | 3/2008 | Clemons et al. |
| 2014/0317935 A1 | 10/2014 | Clemons |
| 2014/0319257 A1 | 10/2014 | Clemons |
| 2014/0331843 A1 | 11/2014 | Hall |
| 2015/0308075 A1 | 10/2015 | Christenson et al. |
| 2015/0308076 A1 * | 10/2015 | Christenson ............ E02F 3/965 30/134 |
| 2016/0001293 A1 | 1/2016 | Raihala |
| 2016/0059328 A1 | 3/2016 | Jacobson et al. |
| 2016/0348339 A1 * | 12/2016 | Christenson ............ E02F 3/965 |
| 2017/0036281 A1 * | 2/2017 | Christenson ......... B23D 35/001 |

FOREIGN PATENT DOCUMENTS

| EP | 0768137 | 4/1997 |
| EP | 1939362 | 7/2008 |

* cited by examiner

Fig.33 ered shear blade side 18,
THREE-SIDED SHIMABLE INDEXABLE SHEAR TIP BOOT

CROSS-REFERENCE TO RELATED APPLICATIONS

The present application is a continuation-in-part of U.S. Ser. No. 14/261,592, filed Apr. 25, 2014 now U.S. Pat. No. 9,713,848 B2.

BACKGROUND OF THE INVENTION

The present invention relates to demolition equipment and more particularly to heavy duty demolition shears for reducing building and construction materials to scrap for recycling.

Demolition of buildings and steel structures has become important where space is needed to build new structures while the demolishment of such structures must be efficient and be able to reduce all materials to a small enough size for recycling and eventual reuse of metals once melted down and reformed. Burying of scrap materials is simply not even an option anymore. In fact, reprocessing of metal materials from demolition destined for scrape yards for recycling has become a huge business.

Demolition shears have become an important tool for demolition jobs. Bridges and large buildings have significant amounts of metal support, metal reinforced concrete and other metal reinforced structures. Such metal pieces are large and often have multiple connections. Cutting of these metals by saw, grinder or torch has become way too impractical, expensive and hazardous. Demotion shears are used to punch through metals and shear the metal structures into small pieces. In fact, metal demolition shears are used to cut metal cables, reinforced concrete, car parts, rods, rebar, rail cars, tanks, pipes, channels and other vehicle frames. Demolition shears can easily shear up to sixteen inch I-beams into small pieces that are only a couple of feet long or less and readily usable for recycling once reduced in size.

Demolition shears are typically mounted on the distal end of a boom structure or dipper stick on a backhoe or excavator. By this arrangement, the shear is actually mobile and capable of moving about a demolition site as well as reaching elevated positions up high in a safe manner. The operation of the shears with one movable and one fixed (or movable) jaw is by hydraulic cylinders.

Figures 1, 2:
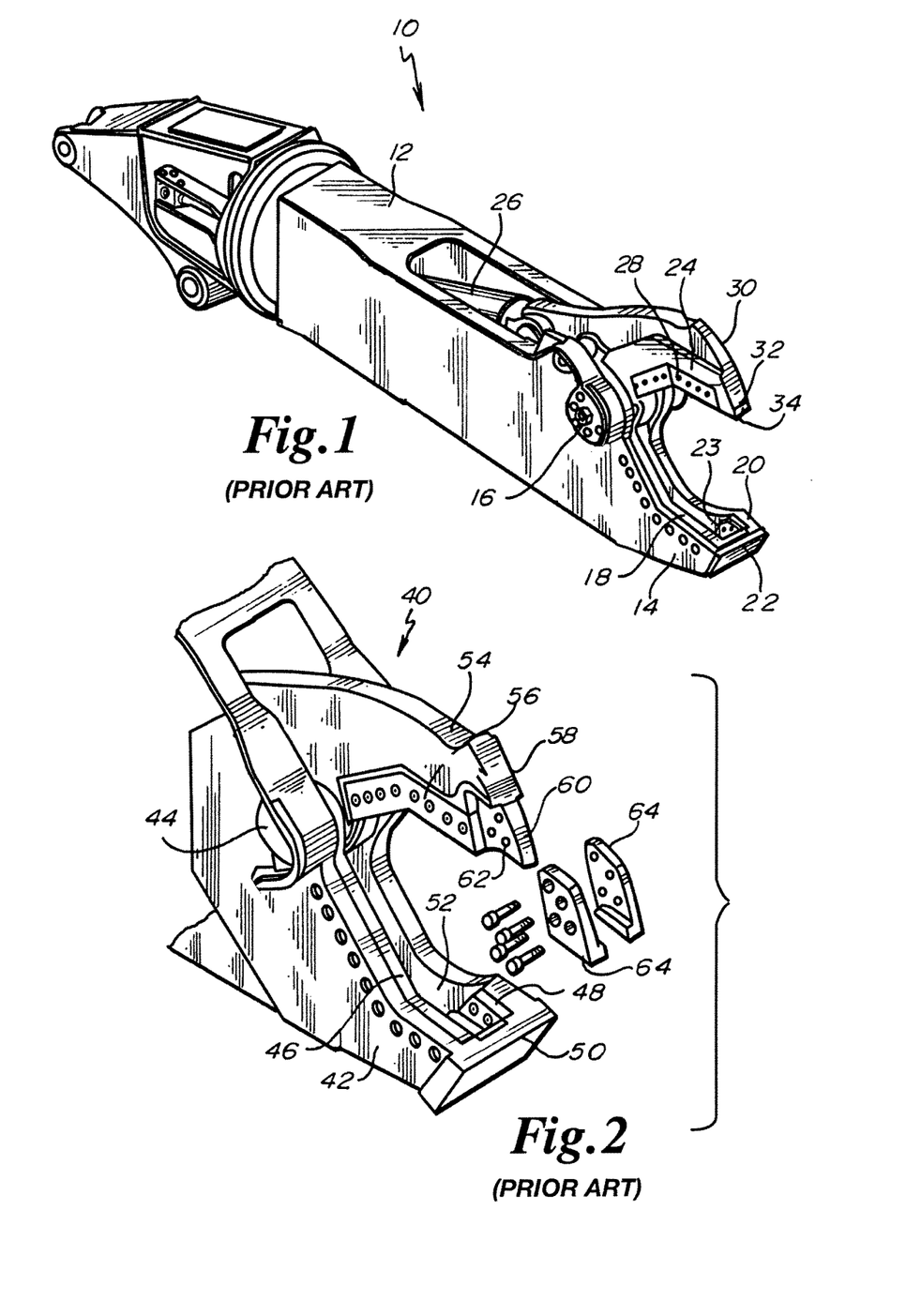
FIG. 1 is a perspective view of a prior art heavy duty demolition shear.
FIG. 2 is a perspective view of another prior art heavy duty demolition shear partially broken away.
Figures 2A, 2B:
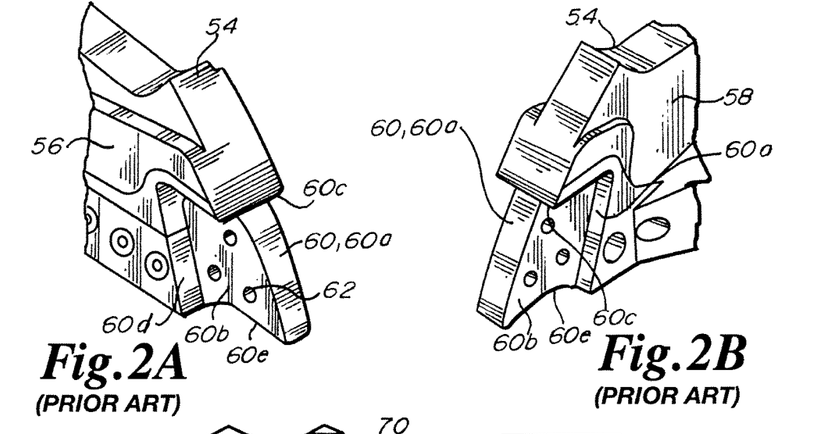
FIG. 2A is a right side perspective view of the upper jaw partially broken away of the prior art heavy duty demolition shear of FIG. 2.
FIG. 2B is a left side perspective view of the upper jaw partially broken away of the prior art heavy duty demolition shear of FIG. 2.

Prior art FIGS. 1 through 2B generally show the structure of a demolition shear. FIG. 1 shows a prior art heavy duty demolition shear 10 with a frame 12 supporting a lower jaw 14 and pivot 16. The lower jaw 14 has a shear blade side 18, a guide blade side 20 and a cross, tie or chin plate 22 forming a recess 23 therebetween. An upper jaw 24 is connected to the fame 12 and lower jaw 14 at pivot 16. A hydraulic cylinder or actuator 26 also is connected to the frame 12 and a rear portion of the upper jaw 24 The upper jaw 24 has a shear blade side 28, a guide blade side 30 with a distal end shear tip or tang 32. In operation, the upper jaw 24 with replaceable shear blades, passes into the recess 23. In this shear, there is a replaceable shear tip 34 welded onto the end of the upper jaw 24 at its tip or tang 32. The tip 34 needs to be periodically replaced as the shear tip becomes worn as it punches through material to be reduced and further shears along the distal shear blade, distal guide blade and cross cutter blade. Replacement is handled by cutting off the tip 34, suitably with a torch, and welding on a new shear tip 34. Over more time, the upper jaw distal end or tang 32 becomes so worn that it must be cut off and a new tip must be welded on.

In FIGS. 2 through 2B is another prior art heavy duty demolition shear 40 with a lower jaw 42, pivot 44, shear blade side 46, guide blade side 58 and a tie plate 50 forming its recess 52 therebetween. The upper jaw 54 has a shear blade side 56, guide blade side 58 and a tang 60. The tang 60 has a front edge 60a, side faces 60b, top seat 60c, rear seat 60d and bottom seat 60e. In this case, the tang 60 is somewhat more protected from the work piece to be sheared and shear blade edges along the lower shear blade, guide blade and cutter blade with replaceable L-shaped shear tip sections 64. Here the distal end of the upper jaw 54 and front edge 60 of the tang 60 are not protected at all. In time with use, the tang side faces 60b become worn down requiring tightening of the L-shape shear tip sections 64 which detrimentally causes the shorter lower L sections to open up and rotate inward at their top thereby causing the cutting edges to move laterally outward which may cause the shear tip portions to break as they strike the distal lower shear blade 46 or guide blade 48. Total clamping force action between the shear tip or tang 60 and the shear tip sections 64 is absolutely required for the shear tip and tang to work properly together and for the tang 60 to not wear out prematurely. It can be costly to replace these worn parts and such repair efforts require the shear 40 to be taken out of operation.

There is a need for a shear tip that encompasses or encapsulates most, if not all, of the shear tang that is substantially one-piece and is adjustable with shims, to insure complete and total clamping force between the shear tang and the shear tip piece or pieces and to minimize tang side face wear and assure proper alignment of the shear tip on the tang to avoid shear tip breakage.

SUMMARY OF THE INVENTION

A one piece three-sided hardened steel boot tip for a distal end upper jaw tang of a heavy duty demolition shear having a upper movable shear jaw with a shear tip or tang, a shear side and a guide side pivotally connected to a lower fixed or movable shear jaw with a shear blade side, a guide side, a distal tie plate and a recess therebetween. The tang has a front edge, side faces with apertures therethrough, a top seat, a rear seat and a bottom seat. The boot tip has a front wall seated on the tang front edge and a right sidewall with an indexing hub seated on the shear side tang face, rear seat and the top seat. A bottom wall of the boot tip is seated on the tang bottom seat forming a shear punching edge between the front wall and the bottom wall. A sidewall is connected to the tang bottom and front walls with a shearing edge between the side and bottom walls. A side plate with an indexing hub is seated on the guide side tang face, the top seat and the rear seat. The boot tip right side and side plate have matching apertures therethrough and alignable with the tang apertures to secure the boot and side plate to the tang for protection thereof from the lower jaw shear side, the guide side and the tie plate as the upper jaw moves into and out of the recess. One or more shims are provided and insertable inside the boot against the tang faces and clampable thereto after the faces have become worn or otherwise requires adjustment for maximum clamping force. An extendable boss maybe on the lower inside face of the side plate as to index and interlock with a matching indexing slot on the distal face of the bottom wall.

A principle object and advantage of the present boot tip invention is that it completely protects all surfaces and edges of the upper jaw tang of a heavy duty demolition shear which otherwise becomes worn over time and hence down time for the shear.

Another object and advantage of the present boot tip invention is the available shims for use against the tang faces as they become worn to insure maximum clamping force and alignment of the boot tip and tang faces which is otherwise diminished as the tang edges and faces wear.

Another object and advantage of the present boot tip invention is that shims have not been used with upper jaw shear tips or tangs before. Shims are important as they increase the clamping power necessary as to not wear down the tang side surfaces and compensate for manufacturing irregularities, tolerances and tang wear which is very common.

Another object and advantage of the present boot tip invention is the available shims for use against the tang faces as they become worn insure that the shear tip or boot tip pieces are properly positioned and aligned with each other which otherwise may be subject to breakage, or poor shearing or cutting.

Another object and advantage of the present invention is that the boot is three-sided lending significant integrity and strength to the boot tip as well as assuring an exact fit about the tang as heretofore not known.

Another object and advantage of the present invention is that the extendable boss on the lower inside face of the side plate indexes and interlocks with a matching indexing slot on the distal face of the bottom wall which secures the plate in place as to not swing up and away from its seat.

DETAILED SPECIFICATION

Prior art demolition shears 10 and 40 have been previously discussed above as shown in FIGS. 1-2B. The main focus of this invention is in the area of the upper jaw 24, 54, at their distal end from the pivot 16, 44 in the area known as the shear tang 32, 60. The tang 32, 60 is a part of a shear 10, 40 that is highly subject to shearing and punching forces, excessive wear, alignment issues and requires periodic maintenance. The present invention encapsulates the tang 32, 60 to protect it from wear and to continue to assure that the maximum possible clamping forces between the tang 32, 60 and the shear tip boot 70, 180.

Figures 3, 4, 5, 6, 7:
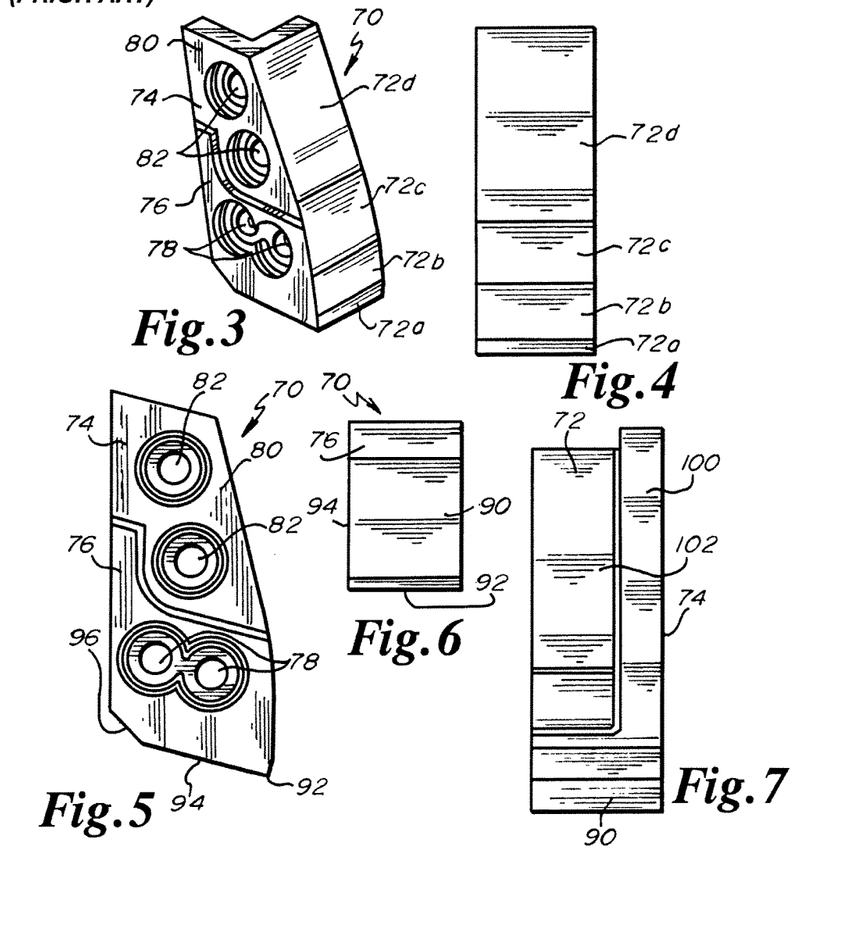
FIG. 3 is a perspective view of the 3-sided shear tip boot of the present invention.
FIG. 4 is a front elevation view of the 3-sided shear tip boot.
FIG. 5 is a right elevation view of the 3-sided shear tip boot.
FIG. 6 is a bottom plan view of the 3-sided shear tip boot.
FIG. 7 is a rear elevation view of the 3-sided shear tip boot.
Figures 8, 9, 10, 11, 12:
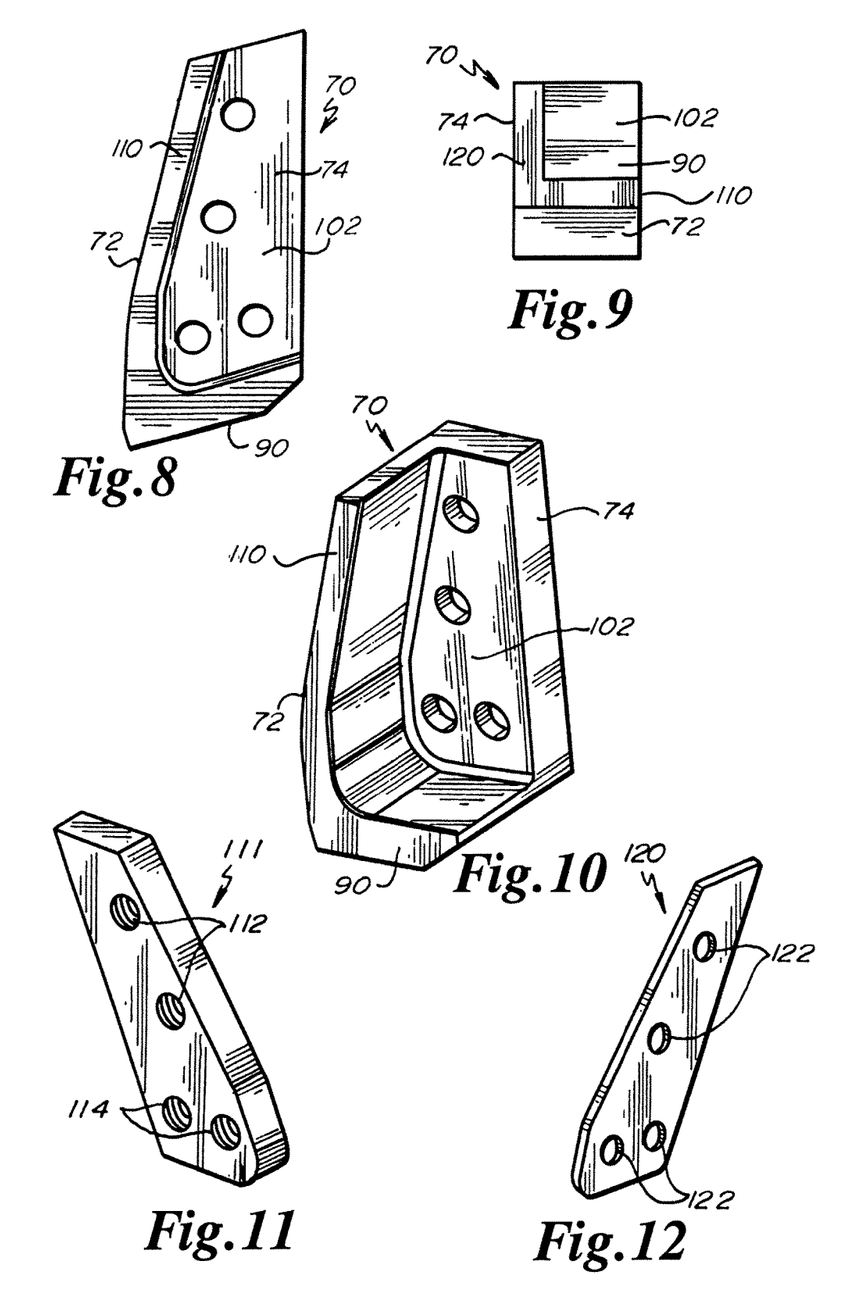
FIG. 8 is a left elevation view of the 3-sided shear tip boot.
FIG. 9 is a top plan view of the 3-sided shear tip boot.
FIG. 10 is a left rear perspective view of the 3-sided shear tip boot.
FIG. 11 is a right perspective view of the access plate for the 3-sided shear tip boot.
FIG. 12 is a left perspective view of a shim for the 3-sided shear tip boot.
Figure 13:
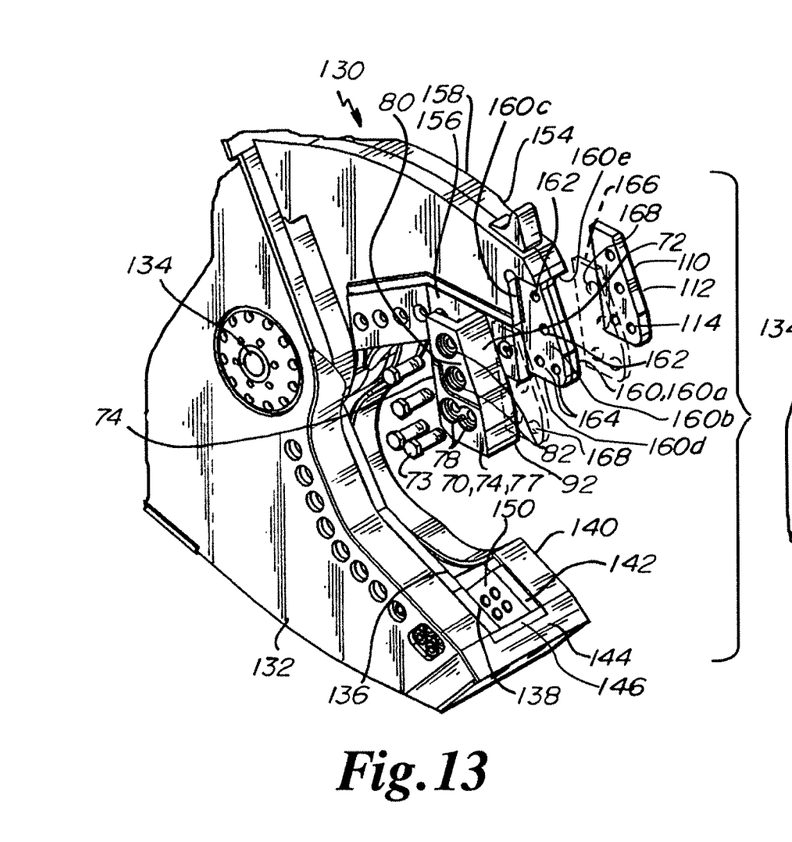
FIG. 13 is a right perspective view of the prior art heavy duty demolition shear of FIG. 2 partially broken away with the 3-sided shear tip boot, shims and access plate in exploded condition.
Figure 14:
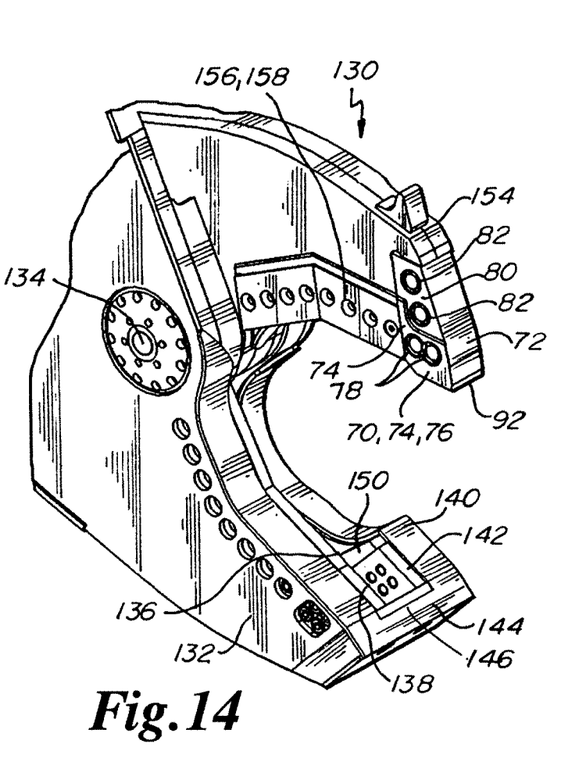
FIG. 14 is a right perspective view of the prior art heavy duty demolition shear of FIG. 2 partially broken away with the 3-sided shear tip boot, shims and access plate assembled on the shear.
Figure 15:
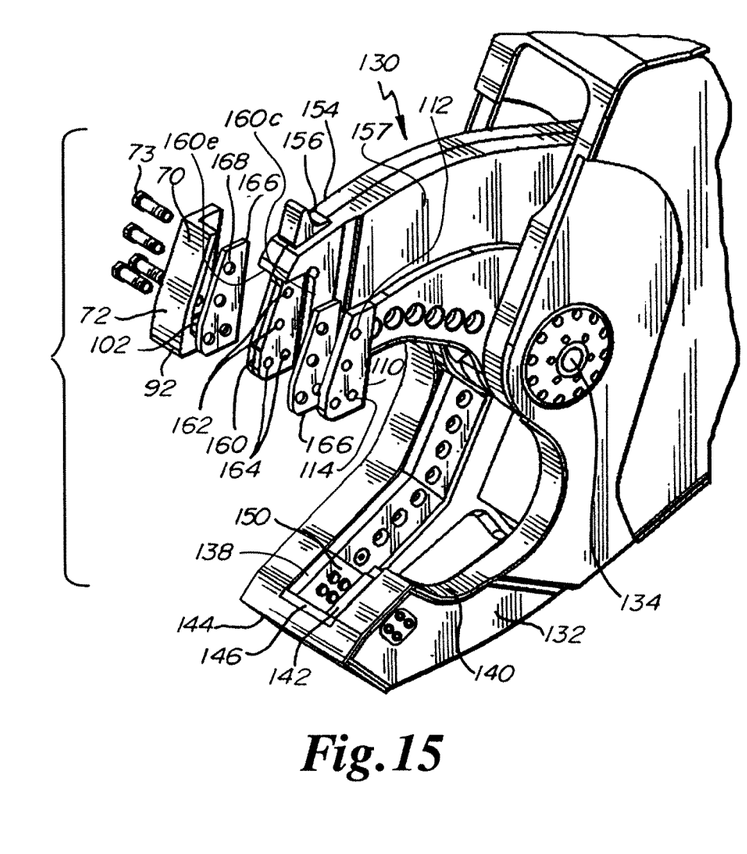
FIG. 15 is a left perspective view of the prior art heavy duty demolition shear of FIG. 2 partially broken away with the 3-sided shear tip boot, shims and access plate in exploded condition.
Figure 16:
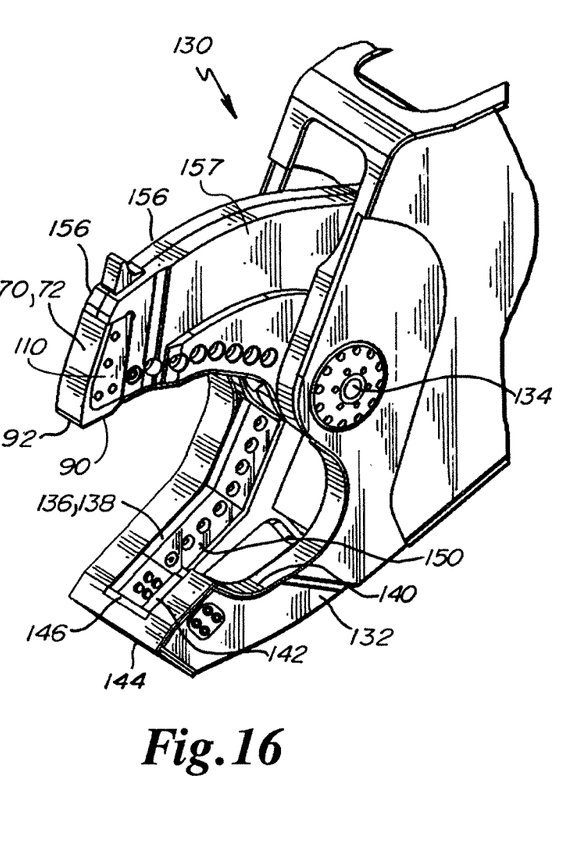
FIG. 16 is a left perspective view of the prior art heavy duty demolition shear of FIG. 2 partially broken away with the 3-sided shear tip boot, shims and access plate assembled on the shear.
Figure 17:
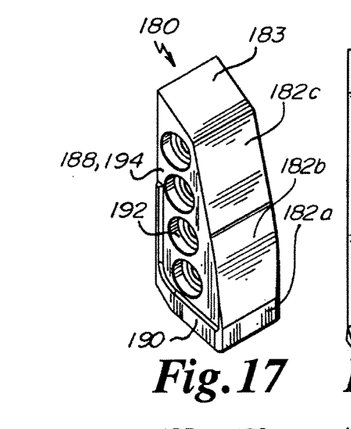
FIG. 17 is a perspective view of a 4-sided shear tip boot second embodiment of the present invention.

Referring to FIGS. 3 through 10, the three-side shear tip boot 70 may be seen which will clamp onto the tang side faces 60b shown in FIGS. 2A and 2B with bolts 73. The boot tip 70 is made from proprietary wear-resistant hardened steel. The boot tip 70 has a seamless front face or wall 72 with panel sections 72a, 72b, 72c, and 72d (FIG. 4). The right side or wall 74 has a lower reinforced portion 76, two horizontally aligned and recessed bolt/nut apertures 78, and an upper portion 80 with two substantially vertically aligned and recessed bolt/nut apertures (FIG. 5). The bottom side or wall 90 has a boot punching edge 92 for punching through a flat work piece, a shear boot edge 94 for shearing with the lower jaw distal shear blade and a trailing boot edge 96 leading directly to flush arrangement with the upper jaw distal shear blade (FIG. 6). The rear view (FIG. 7) shows the rear side 100 of the boot tip 70 with a tang cavity 102 bounded by front wall 72, right wall 74 and bottom wall 90. The left side 110 also shows the tang cavity 102, bottom wall 90, front wall 72 and right wall 74 (FIG. 8). The top side 120 (FIG. 9) shows the front wall 72, right wall 74, bottom wall 90, left side 110 and tang cavity 102. The rear perspective view (FIG. 10) shows front wall 72, right wall 74, bottom wall 90 and tang cavity 102.

FIG. 11 shows the side or access plate 110 also made of a proprietary wear-resistant hardened steel. Plate 110 closes the open left side when in position. Plate 110 has two substantially vertical threaded apertures 112 and two horizontal threaded apertures 114 which will threadingly receive bolts 73 when passed through the boot tip right sidewall 74 apertures, tang apertures and thread into access plate 110. Access plate 110 is flush with the left side when assembled on the tang 60.

FIG. 12 shows a novel shim 120 with apertures 122 alignable with apertures in boot tip 70, tang 60 and access or side plate 110. Shims 120 have not been used with upper jaw shear tips or tangs before. Shims 120 are made from high quality sheet steel and made available in thicknesses starting with 0.001 of an inch graduating a few thousandth of an inch in thicknesses depending on tang surface wear. Shims 120 may also be tapered in thickness if needed for shear tip 110 alignment and adjustments on tang 60.

Referring to FIGS. 13 through 16, the assembly of boot tip 70, optional shims 120, 166 and access or side plate 110 onto tang 60, 160 of demolition shear 130 may be appreciated. Demolition shear 130 has a lower jaw 132 with a pivot 134. Lower jaw 132 has a shear blade side 136 with distal shear blade 138, a guide blade side 140 with a distal guide blade 142 and a cross plate 144 with a cross blade 146 all forming a recess 150 therebetween. Upper jaw 154 has a shear blade side with distal shear blade 158 and a guide blade side 157.

Upper jaw 154 has a distal end or shear tang 160 with a front edge 160a, side faces 160b, rear seat 160c, bottom seat 160d and top seat 160e. The tang faces 160b have two substantially vertical apertures 162 and two horizontal apertures 164. Shims 166 (similar to 120) with matching apertures 168 are optionally shown in position for assembly. Threaded bolts 73 secure the boot tip 70, shims 166 and access plate 110 about tang 160 as the boot tip 70 and access plate 110 rest and are supported in rear seat 160c, bottom seat 160d and top seat 160e. If the tang faces 160b become worn, additional or thicker shims 160 may be employed with the boot tip 70 assembly to assure that the greatest clamping force is applied to the tang 160, as access plate 110 is flush with boot tip left side 110. Plate 110 is also supported by front wall 72 and bottom wall 90 of the boot tip 70 as well as the tang rear seat 160c and top seat 160e.

Figures 18, 19:
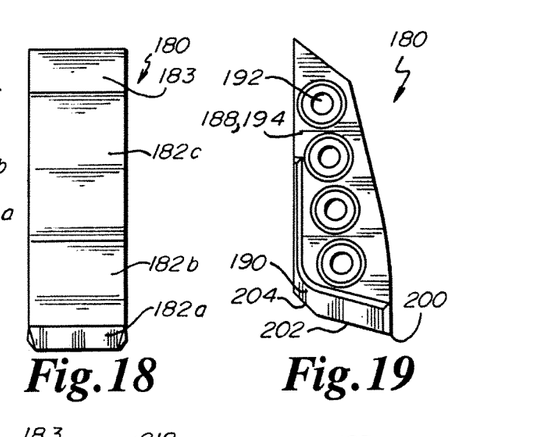
FIG. 18 is a front elevation view of the 4-sided shear tip boot.
FIG. 19 is a right elevation view of the 4-sided shear tip boot.
Figures 20, 21, 22, 23, 24, 25, 26:
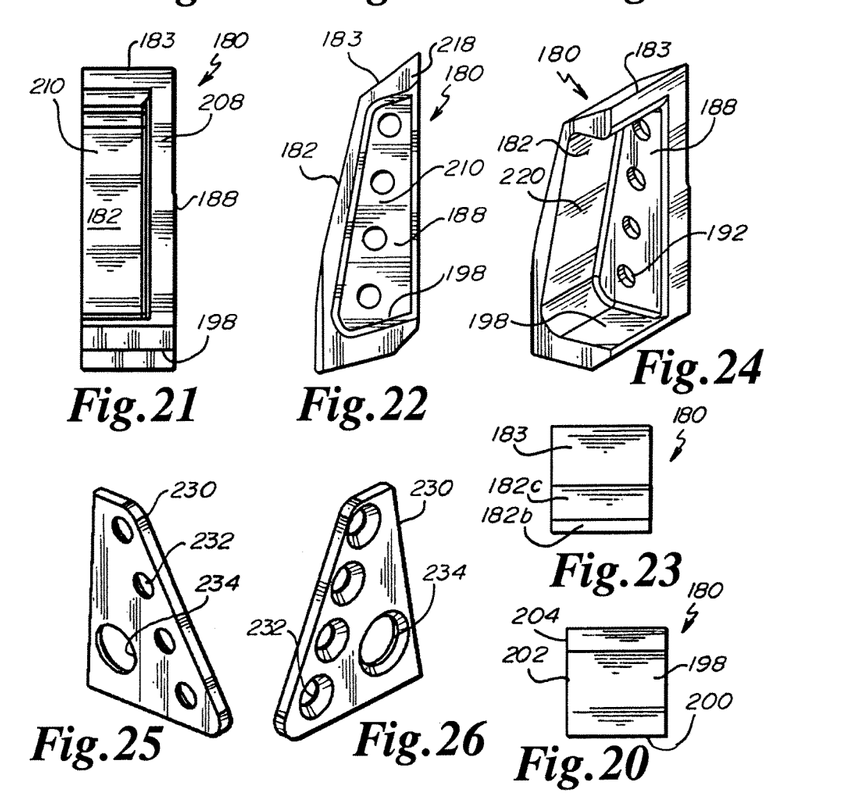
FIG. 20 is a bottom plan view of the 4-sided shear tip boot.
FIG. 21 is a rear elevation view of the 4-sided shear tip boot.
FIG. 22 is a left elevation view of the 4-sided shear tip boot.
FIG. 23 is a top plan view of the 4-sided shear tip boot.
FIG. 24 is a left rear perspective view of the 4-sided shear tip boot.
FIG. 25 is a right perspective view of the access plate for the 4-sided shear tip boot.
FIG. 26 is a left perspective view of the access plate for the 4-sided shear tip boot.
Figure 27:
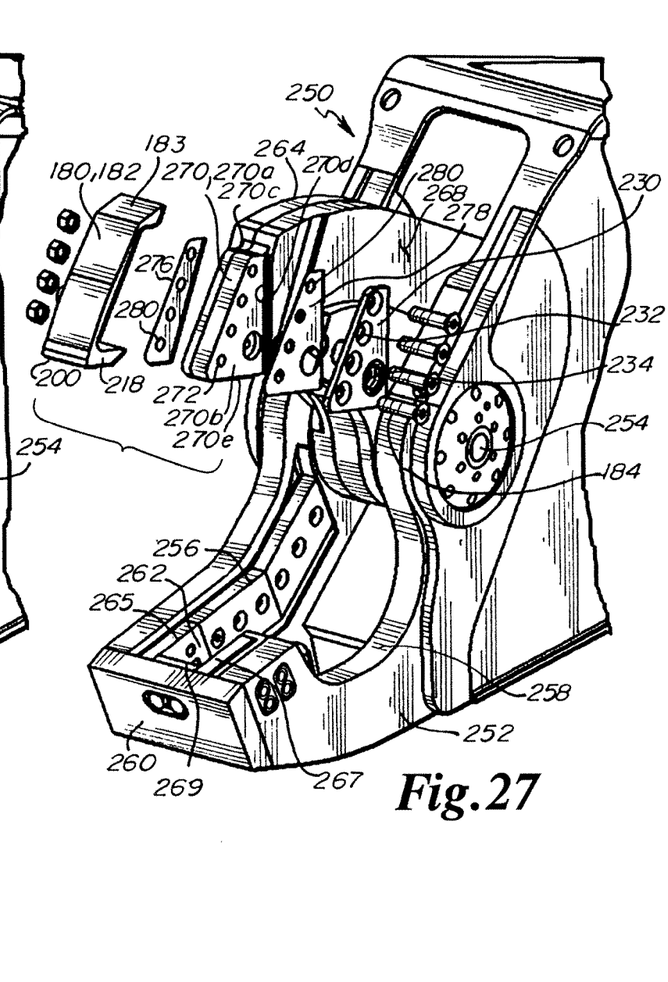
FIG. 27 is a left perspective view of a heavy duty demolition shear partially broken away with the 4-sided shear tip boot, shims and access plate in exploded condition.
Figure 28:
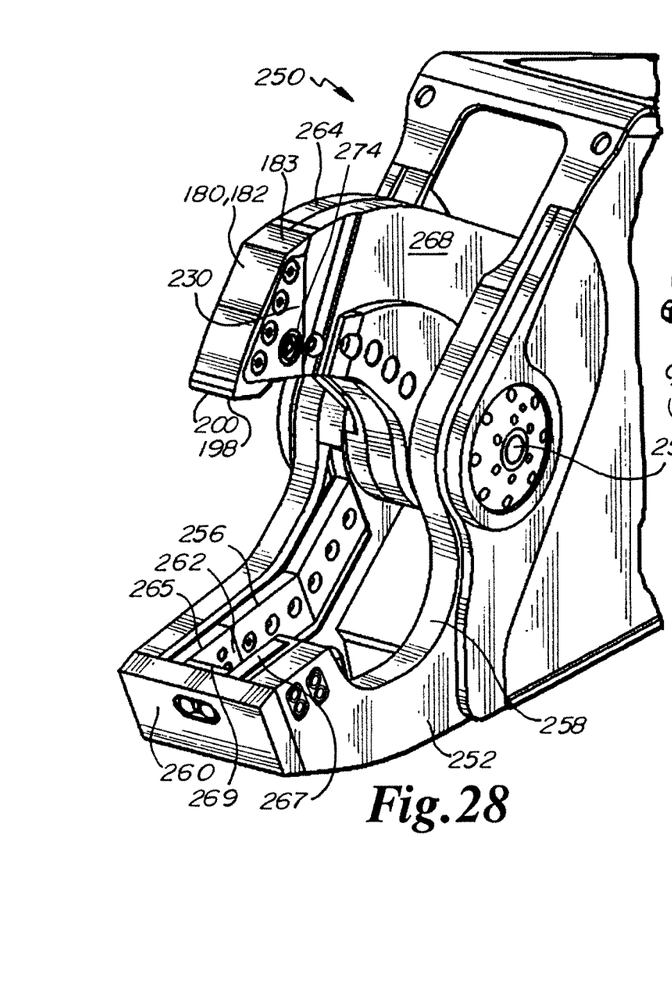
FIG. 28 is a left perspective view of the heavy duty demolition shear of partially broken away with the 4-sided shear tip boot, shims and access plate assembled on the shear.
Figures 29, 30:
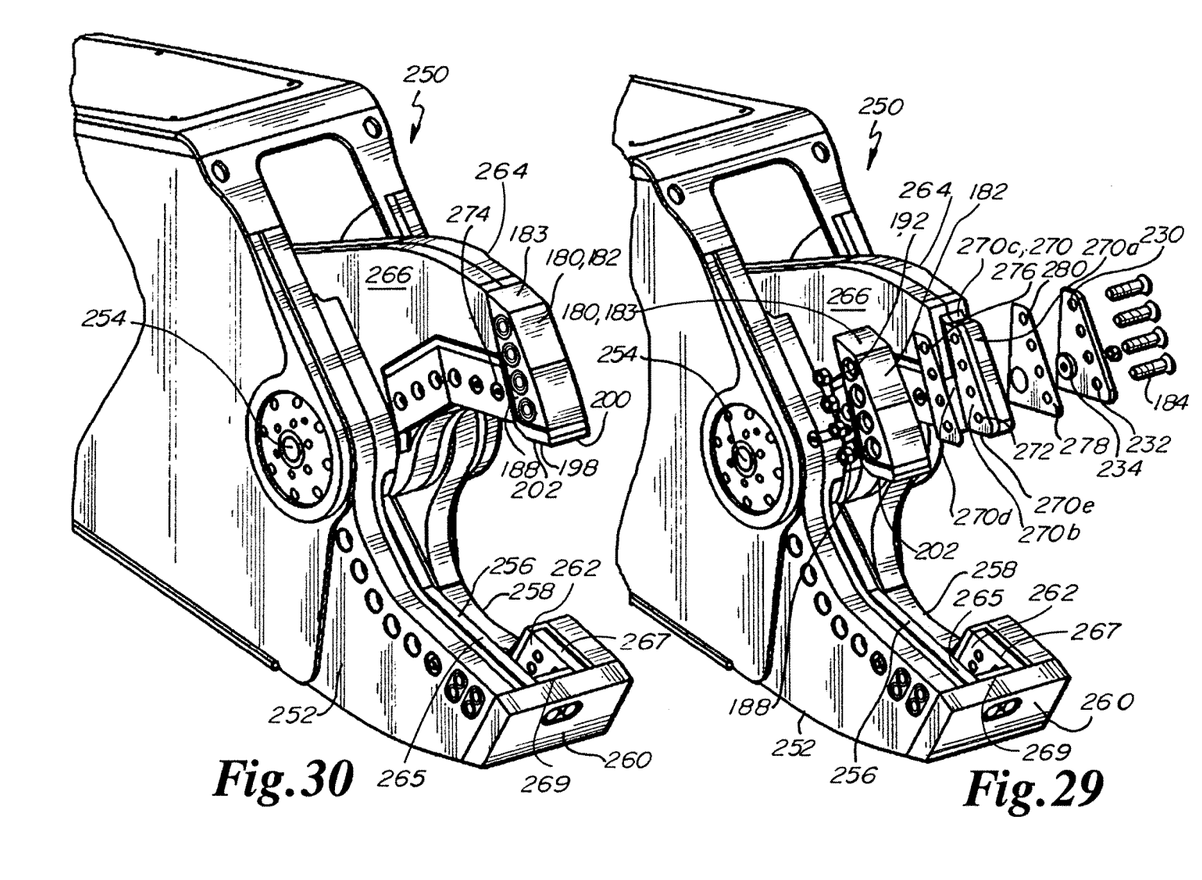
FIG. 29 is a right perspective view the heavy duty demolition shear partially broken away with the 4-sided shear tip boot, shims and access plate in exploded condition.
FIG. 30 is a right perspective view of the prior art heavy duty demolition shear partially broken away with the 4-sided shear tip boot, shims and access plate assembled on the shear.

FIGS. 17 through 24 show another embodiment of the invention as a four-sided shear tip boot 180 which additionally covers the top side of the shear tang 270 discussed below in FIGS. 27 through 30. This boot tip 180 is also made from proprietary wear-resistant hardened steel. The boot tip 180 has a seamless front face or wall 182 with panel sections 182a, 182b and 182c (FIG. 18). The right side or wall 188 has a lower reinforced portion 190 and four vertical or diagonal bolt/nut apertures 192 in the upper portion 194 (FIG. 19). The bottom side or wall 198 has a boot punching edge 200 for punching through a flat work piece, a shear boot edge 202 for shearing with the lower jaw distal shear blade and a trailing boot edge 204 leading directly to flush arrangement with the upper jaw distal shear blade (FIG. 20). The rear view (FIG. 21) shows the rear side 208 of the boot tip 180 with tang cavity 210 bounded by front wall 182, right wall 188, bottom wall 198 and top wall 183. The left side 218 also shows the tang cavity 210, bottom wall 198, front wall 182, right wall 188 and top wall 183 view (FIG. 22). The top side wall 183 (FIG. 23) shows the front wall 182 b, c. The rear perspective view (FIG. 24) shows front wall 182, right wall 188, bottom wall 198, top wall 183 and tang cavity 210.

FIGS. 25 and 26 shows the access or side plate 230 also made of a proprietary wear-resistant hardened steel. Plate 230 closes the open left side 218 when in position. Plate 230 has four vertical or diagonal threaded apertures 234 which will threadingly receive bolts 184 when passed through the boot tip right side wall 188, tang apertures 272 and thread into access plate 230. Larger aperture 234 is for distal shear blade bolt 274 which further adds to clamping power to the tang 270.

Referring to FIGS. 27 through 30, the assembly of four-sided boot tip 180, optional shims 276, 278 and access plate 230 onto tang 270 of demolition shear 250 may be appreciated. Demolition shear 250 has a lower jaw 252 with a pivot 254. Lower jaw 252 has a shear blade side 256 with distal shear blade 265, a guide blade side 258 with a distal guide blade 267 and a cross plate 260 with a cross blade 269 all forming a recess 262 therebetween. Upper jaw 264 has a shear blade side 266 with distal shear blade and a guide blade side 268.

Upper jaw 264 has a distal end or shear tang 270 with a front edge 270a, side faces 270b, top seat 270c rear seat 270d and bottom seat 270e. The tang faces 270b have four diagonal apertures 272. Optional shims 276, 278 with matching apertures 280 are shown in position for assembly. Threaded bolts 184 secure the boot tip 180, shims 276, 278 and side access plate 230 about tang 270 as the boot tip 180 and side access plate 230 rest and are supported in rear seat 160d, bottom seat 160e and top seat 160c. If the tang faces 270b become worn, additional or thicker shims 276, 278 may be employed with the boot tip 180 assembly to assure that the greatest clamping force is applied to the tang 270. Upper or top wall 183 assists in holding the boot tip 180 in place when the upper jaw 264 is moved out of the recess 262. As side plate 230 is flush with boot tip left side 218. Plate 230 is also supported by front wall 182, bottom wall 198 and top wall 183. The side plate 230 may also have an indexing boss 234 (FIG. 29) to index into one of the tang 270 apertures 272 for further securement of the side plate 230.

In operation, the adjustable shear boot tips 70, 180 with shims 120, 276, 278 are assuredly always in proper alignment with the shear tang 160, 270 as the shear 130, 250 punches and shears a workpiece as the upper jaw 154, 264 passes by the lower jaw 132, 252 and into recess 150, 262. This proper alignment assures that upper jaw 154, 264 go into and comes up out of recess 150, 262 without striking any part of the lower jar 132, 252. Tang 160, 270 wear and manufacturing tolerances can be compensated for with shims 120, 276, 278 which have not been used before in this arrangement.

Figure 31:
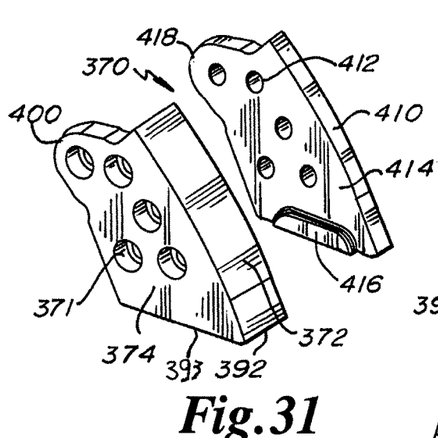
FIG. 31 is an exploded front right view of the 3-sided shear tip boot show the boss or tab on the lower inside face of the side plate.
Figure 32:
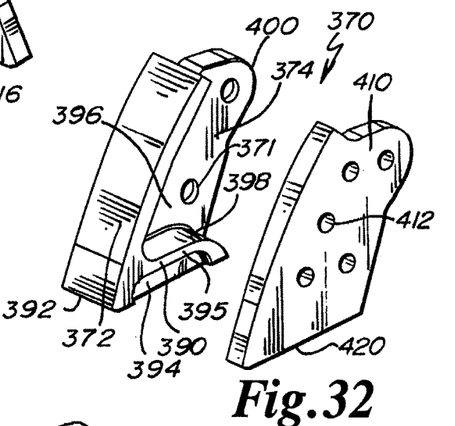
FIG. 32 is an exploded front left view of the 3-sided shear tip boot showing the indexing slot for the boss.
Figure 33:
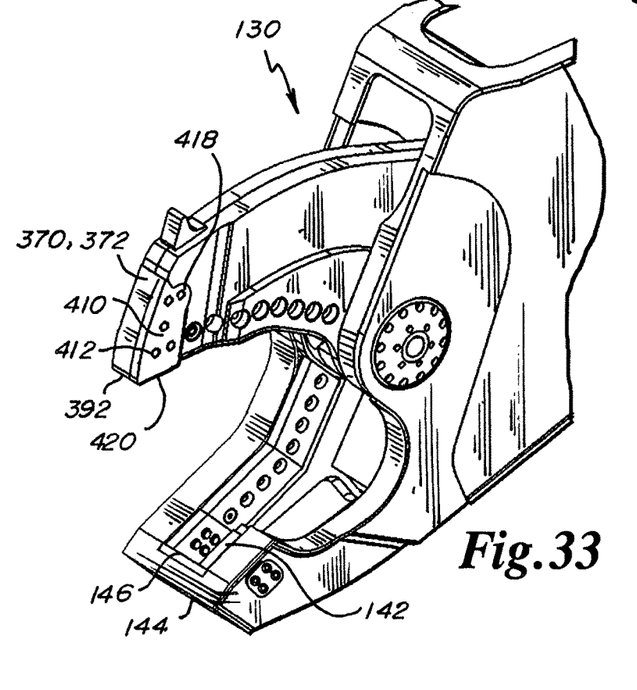
FIG. 33 is a left perspective view of the prior art heavy duty demolition shear of FIG. 2 partially broken away with the 3-sided shear tip boot, shims and side plate assembled onto the shear tip.

Referring to FIGS. 31 through 33, another embodiment of the three-side shear tip boot 370 may be seen which will clamp onto the tang side faces 60b shown in FIGS. 2A and 2B with bolts 73. The boot tip 370 is similarly made from proprietary wear-resistant hardened steel. The boot tip 370 has a front face or wall 372. The right side or sidewall 374 has two horizontally aligned, one middle and two upper horizontally aligned and recessed bolt/nut apertures 371. The bottom side or wall 390 has a boot punching edge 392 for punching through a flat work piece and the right side wall 374 at the bottom wall 390 has a shear boot edge 395 for shearing with the lower jaw distal shear blade. The inside rearwardly sloping wall 398 will index and seat on the tang bottom seat 60e. The distal face 395 of bottom wall 390 has a boss or tab indexing slot 394 which cooperates with side plate 410 explained below. A tang cavity 396 is formed by the sidewall 374, front wall 372 and bottom wall 390. An indexing hub 400 is on upper rear portions of the right sidewall 374 to be indexed and seated on the rear and top tang seats 60d, 60c.

The side plate 410 is also made of a proprietary wear-resistant hardened steel. Plate 410 closes the open left side of the boot tip 370 when in position. Plate 410 has threaded apertures 412 which will threadingly receive bolts 73 when passed through the boot tip right side wall 374 apertures 371, tang apertures 62 and threaded into side plate 410. Side plate 410 is flush with the bottom wall 390 when assembled on the tang 60 and has a guide side shearing edge 420. The inner wall distal face 414 or side plate 410 at its lower portion has an indexing interlocking boss or tab 416 which will fit into indexing slot 394 when the tip boot 370 is mounted onto the shear tang 60. This arrangement further indexes and interlocks the boot tip 370 and side plate 410 together so that the side plate 410 does not scizzor upwardly and outwardly possibly striking the cross plate 144 or cross blade 146 or guide side shear blade 142. An indexing hub 418 is on upper rear portions of the inner wall 418 of right sidewall 374 to be indexed and seated on the rear and top tang seats 60d, 60c.

Shims 120 may also be used with this embodiment and are made from high quality sheet steel available in thicknesses starting with 0.001 of an inch graduating a few thousandth of an inch in thicknesses depending on tang surface wear. Shims 120 may also be tapered in thickness if needed for shear tip 370 clamping adjustments on tang 60.

The assembly of boot tip 370, optional shims 120, 166 and access or side plate 410 onto tang 60 or 160 of demolition shear 40, 130 are similar to the previous boot tip assemblies 70 and 180.

The above embodiments are for illustrative purposes. Other shear structures may use the shear tip and shims of the present invention. The following claims define the true scope of this invention.

What is claimed:

1. A boot tip assembly for a distal end tang of a demolition shear having a upper movable shear jaw with a shear side and a guide side pivotally connected to a lower shear jaw with a shear blade side, a guide side, a distal tie plate and a recess therebetween wherein the tang has a front edge, side faces with apertures therethrough, a top seat, a rear seat and a bottom seat, the boot tip assembly comprising:
   (a) a one piece three-sided hardened steel boot tip, comprising:
      (i) a front wall adapted to be seated on the tang front edge;
      (ii) a right sidewall adapted to be seated on the shear side tang face, the tang top seat and the tang rear seat;
      (iii) a bottom wall with a distal side face adapted to be seated on the tang bottom seat and forming a shear punching edge between the front wall and the bottom wall and forming a shear blade side shearing edge between the right sidewall and the bottom wall; and
   (b) a side plate with a guide blade side shearing edge adapted to be seated on the guide side tang face, the tang top seat and the tang rear seat with the boot tip right sidewall and the side plate having matching apertures therethrough and alignable with the tang apertures to secure the boot tip and the side plate to the tang with bolts, the front, right side and the bottom walls together with the side plate defining a tang cavity for encapsulation and protection of the tang from the lower jaw shear side, the guide side and the tie plate as the upper jaw moves through the recess.

2. The boot tip assembly of claim 1, further comprising one or more shims with matching apertures adapted to be insertable in between the boot tip against one of the tang faces and the side plate secured thereto with bolts.

3. The boot tip assembly of claim 1, further comprising an indexing hub on upper rear portions of the right sidewall and the side plate to be indexed and seated on the rear and top tang seats.

4. The boot tip assembly of claim 1, wherein the bottom wall has a rear inner surface that slopes downwardly to be indexed and seated on the bottom tang seat.

5. A boot tip assembly for a distal end tang of a demolition shear having a upper movable shear jaw with a shear side and a guide side pivotally connected to a lower shear jaw with a shear blade side, a guide side, a distal tie plate and a recess therebetween wherein the tang has a front edge, side faces with apertures therethrough, a top seat, a rear seat and a bottom seat, the boot tip assembly comprising:
   (a) a one piece three-sided hardened steel boot tip, comprising:
      (i) a front wall adapted to be seated on the tang front edge;
      (ii) a right sidewall adapted to be seated on the shear side tang face, the tang top seat and the tang rear seat;
      (iii) a bottom wall adapted to be seated on the tang bottom seat forming a shear punching edge between the front wall and the bottom wall and forming a shear blade side shearing edge between the right sidewall and the bottom wall and the bottom wall having a distal face;
   (b) a side plate adapted to be seated on the guide side tang face, the tang top seat and the tang rear seat with the boot tip right side and the side plate having matching apertures therethrough and alignable with the tang apertures to secure the boot tip and the side plate to the tang with bolts, the front, right side and bottom walls together with the side plate defining a tang cavity for encapsulation and protection of the tang from the lower jaw shear side, the guide side and the tie plate as the upper jaw moves through the recess, the side plate having an inner face;

(c) at least one shim with matching apertures adapted to be insertable in between the boot tip against one of the tang faces and the side plate secured thereat with bolts; and (d) an indexing interlocking slot on the distal face of the bottom wall and a boss on the inner face of the side plate.

6. The boot tip assembly of claim 5, further comprising an indexing hub on upper rear portions of the right sidewall and the side plate to be indexed and seated on the rear and top tang seats.

7. The boot tip assembly of claim 5, wherein the bottom wall has a rear inner surface that slopes downwardly to be indexed and seated on the bottom tang seat.

8. A boot tip assembly for a distal end tang of a demolition shear having a upper movable shear jaw with a shear side and a guide side pivotally connected to a lower shear jaw with a shear blade side, a guide side, a distal tie plate and a recess therebetween, wherein the tang has a front edge, side faces with apertures therethrough, a top seat, a rear seat and a bottom seat, the boot tip assembly comprising:

(a) a one piece three-sided hardened steel boot tip, comprising:

(i) a front wall adapted to be seated on the tang front edge;

(ii) a right sidewall adapted to be seated on the shear side tang face, the tang top seat and the tang rear seat;

(iii) a bottom wall adapted to be seated on the tang bottom seat forming a shear punching edge between the front wall and the bottom wall and forming a shear blade side shearing edge between the right side wall and the bottom wall and the bottom wall having a distal face;

(b) a side plate adapted to be seated on the guide side tang face, the top seat and the rear seat with the boot tip right sidewall and the side plate having matching apertures therethrough and alignable with the tang apertures adaptable to secure the boot tip and the side plate to the tang with bolts, the front, right side, bottom walls together with the side plate defining a tang cavity for encapsulation and protection of the tang from the lower jaw shear side, the guide side and the tie plate as the upper jaw moves through the recess, the side plate having an inner face;

(c) an indexing interlocking slot on the distal face of the bottom wall and a boss on the inner face of the side plate; and (d) an indexing hub on upper rear portions of the right sidewall and the side plate adapted to be indexed and seated on the rear and top tang seats.

9. The boot tip assembly of claim 8, further comprising one or more shims with matching apertures adapted to be insertable in between the boot tip against one of the tang faces and the side plate secured thereat with bolts.

10. The boot tip assembly of claim 8, wherein the bottom wall has a rear inner surface that slopes downwardly to be indexed and seated on the bottom tang seat.

\* \* \* \* \*

UNITED STATES PATENT AND TRADEMARK OFFICE
CERTIFICATE OF CORRECTION

PATENT NO. : 10,092,967 B2
APPLICATION NO. : 15/234514
DATED : October 9, 2018
INVENTOR(S) : Ross Denny Christenson et al.

It is certified that error appears in the above-identified patent and that said Letters Patent is hereby corrected as shown below:

In Column 1, Line 33, delete "Demotion" and insert --demolition-- therefor.

In Column 2, Line 16, delete "edge 60" and insert --edge 60a-- therefor.

In Column 4, Line 40, after "view" insert --of-- therefor.

In Column 4, Line 49, delete "and".

In Column 7, Line 18, delete "395" and insert --393-- therefor.

In Column 7, Line 44, delete "inner wall 418 of right sidewall 374" and insert --side plate 410-- therefor.

Signed and Sealed this
Twenty-seventh Day of November, 2018

Andrei Iancu
*Director of the United States Patent and Trademark Office*